(12) United States Patent
Piekutowski et al.

(10) Patent No.: US 8,091,256 B2
(45) Date of Patent: Jan. 10, 2012

(54) LOADER ELEVATION CONTROL SYSTEM

(75) Inventors: Richard Piekutowski, Dayton, OH (US); Kent Kahle, Dayton, OH (US); Robert Beekman, Dayton, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 563 days.

(21) Appl. No.: 12/014,475

(22) Filed: Jan. 15, 2008

(65) Prior Publication Data

US 2009/0178816 A1   Jul. 16, 2009

(51) Int. Cl.
*E02F 3/43* (2006.01)
*G06F 19/00* (2011.01)

(52) U.S. Cl. ............................................. 37/348; 701/50

(58) Field of Classification Search .................... 37/347, 37/348, 382, 411; 701/36, 50; 172/2–11, 172/810, 811, 819; 356/139.05, 159, 141.1, 356/141.5, 141.4
See application file for complete search history.

(56) References Cited

U.S. PATENT DOCUMENTS

| | | | |
|---|---|---|---|
| 4,244,123 A | | 1/1981 | Lazure et al. |
| 5,771,978 A | * | 6/1998 | Davidson et al. ............... 172/4.5 |
| 6,061,617 A | | 5/2000 | Berger et al. |
| 6,246,939 B1 | | 6/2001 | Nozawa |
| 6,263,595 B1 | * | 7/2001 | Ake ................................ 37/348 |
| 6,646,732 B2 | * | 11/2003 | Ohtomo et al. ............ 356/141.5 |
| 6,954,999 B1 | * | 10/2005 | Richardson et al. ............ 37/348 |

FOREIGN PATENT DOCUMENTS

| | | |
|---|---|---|
| DE | 10346413 A1 | 5/2005 |
| EP | 1211357 A1 | 6/2002 |

OTHER PUBLICATIONS

International Search Report and Written Opinion pertaining to International application No. PCT/US2008/086787 dated Mar. 6, 2008.

* cited by examiner

*Primary Examiner* — Robert Pezzuto
(74) *Attorney, Agent, or Firm* — Dinsmore & Shohl LLP (57) ABSTRACT

A system for determining the elevation of a part of an implement, with the implement being attached to the ends of a pair of lift arms of a loader machine, includes a laser transmitter providing a reference beam of laser light. The beam may be a thin beam that is swept in a reference plane, or it may be a pair of fan shaped beams that are continuously rotated. A first beam detector is mounted on one of the pair of lift arms of the loader machine for detecting said reference beam and providing a first output. A second beam detector is mounted on the same lift arm and is spaced along the lift arm from the first beam detector for detecting the reference beam and providing a second output. A control circuit, responsive to the first beam detector and to the second beam detector, determines the elevation of the part of the implement based on the first and second outputs, and provides a projected implement elevation.

29 Claims, 5 Drawing Sheets

LOADER ELEVATION CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a front loader, such as for example a skid steer loader or a multi-terrain loader, and more particularly to a machine having a pair of forward-extending lift arms that support and position an implement, such as a digging bucket or the like. Loaders of various types are well known in the art, and typically have a body and ground engaging drive elements supporting the body. The drive elements may be either front and rear pairs of driven wheels, or left and right driven endless tracks. Typically, such a loader has left and right interconnected lift arm assemblies that are pivotally mounted to respective tower portions of the body near the rear of the loader. The implement, such as for example a bucket with a forward facing row of teeth, is typically pivotally attached at the forward ends of the lift arms. Hydraulic lift actuators are connected between the body and the lift arm assemblies to raise and lower the lift arms together. One or more hydraulic actuators are also connected between the lift arm assemblies and the implement to tilt the implement relative to the lift arms during operation of the loader.

Loaders of this type have a great many uses, and they typically have a wide variety of implements that can be readily interchanged. Examples of such implements include dirt buckets, utility buckets, multi-purpose buckets, pallet forks, utility grapple buckets, light material buckets, utility forks, industrial grapple buckets, industrial grapple forks, angle blades, augers, brooms, cold planers, hydraulic hammers, landscape rakes, landscape tillers, material handling arms, stump grinders, trenchers, and vibratory compactors. Dirt buckets and other implements may be used for excavating material, and also for grading, both in a forward direction and in a reverse direction by back blading.

Traditional guidance and automated blade control systems of the type used with graders and bulldozers typically include position sensors directly mounted on the machine blades. This is not practical with a loader because a sensor on a loader implement, such as a loader bucket, would likely be damaged quickly due to the way in which loader buckets are used. For example, although positioning a laser receiver directly on a mast that extends upward from a loader implement simplifies the elevation measurement process, since the implement is always a fixed distance below the measured elevation of the laser receiver, the receiver will be subjected to treatment so rough that it will not function for an extended period of time.

Nevertheless, it is highly desirable to be able to determine the position of a loader implement, and to provide for control of the loader implement, either by displaying for the operator the position of the implement with respect to the desired height of the implement, or by automated control of the implement.

SUMMARY OF THE INVENTION

These needs are met by a system for determining the elevation of an implement mounted at the end of a pair of arms on a machine. The system includes a first elevation sensor mounted on one of the arms, a second elevation sensor mounted on the arm, closer to the implement than the first elevation sensor and spaced from the first elevation sensor and the part of the implement by known distances, and a control circuit. The control circuit is responsive to the first elevation sensor and to the second elevation sensor, for calculating the elevation of the first part of the implement. The system may include a laser transmitter for transmitting a reference beam of laser light. The first and second elevation sensors may each comprise laser receivers for sensing the reference beam of laser light. The laser transmitter advantageously transmits a beam of laser light that is swept through a reference plane. Alternatively, the laser transmitter may transmit a pair of non-parallel, fan shaped beams that are rotated about a vertical axis.

The control circuit determines the elevation of the first part of the implement by determining the elevation of a point above the first part of the implement. The point is a fixed distance above the first part of the implement, and is aligned with the first and second elevation sensors.

The machine travels across a work site with the implement extending generally forward of the machine in the direction of travel, and the control circuit determines the elevation of the first part of the implement by determining the elevation of a point above the first part of the implement. This point is a fixed distance above the first part of the implement and is aligned with the first and second elevation sensors. The point may move forward of the first part of the machine by a distance that is related to the forward speed of the machine. This variable spacing of the point may be used to compensate for undesired delays in the machine control system.

The system may further include an inclinometer on the implement, providing an inclinometer output to the control circuit such that the control circuit can determine the elevation of a second part of the implement based on the elevation of the first part of the implement and on the inclination of the implement from the first part of the implement to the second part of the implement. The system may include a display, responsive to the control circuit, for displaying the elevation of the second part of the implement as based on the projected implement elevation. The system may alternatively include an angle sensor in lieu of the inclinometer, providing an angle sensor output to the control circuit. The angle sensor output indicates the relative angular orientation of the implement with respect to the arms, such that the control circuit can determine the elevation of a second part of the implement based on the elevation of the first part of the implement and on the relative angular orientation of the implement with respect to the arms.

The system may further include an inclinometer on the implement, providing an inclinometer output to the control circuit such that the control circuit can determine the elevation of the first part of the implement taking into account the inclination of the implement with respect to a nominal implement position. The system may include a display, responsive to the control circuit, for displaying the elevation of the first part of the implement. The system may alternatively include an angle sensor in lieu of the inclinometer, providing an angle sensor output to the control circuit. The control circuit determines the elevation of the first part of the implement, taking into account the relative angular orientation of the implement with respect to a nominal angular orientation of the implement.

The system may further comprise a third beam detector, mounted on the other of the pair of arms of the machine and spaced from the first and second elevation sensors, for detecting elevation and providing an output to the control circuit. The control circuit determines the lateral tilt of the pair of arms of the machine. A display is responsive to the control circuit, for displaying the lateral tilt of the pair of arms of the machine. The implement may comprise any of a plurality of attachments. The dimensions of the attachments are stored in the control circuit to facilitate changing attachments. The machine may comprise a loader machine.

Accordingly, it is an object of the present invention to provide a system for determining the elevation of an implement mounted at the end of a pair of arms on a machine, such as a loader machine, that determines the elevation of a point that is a fixed distance above the implement.

DETAILED DESCRIPTION OF THE PREFERRED EMBODIMENTS

Figure 1:
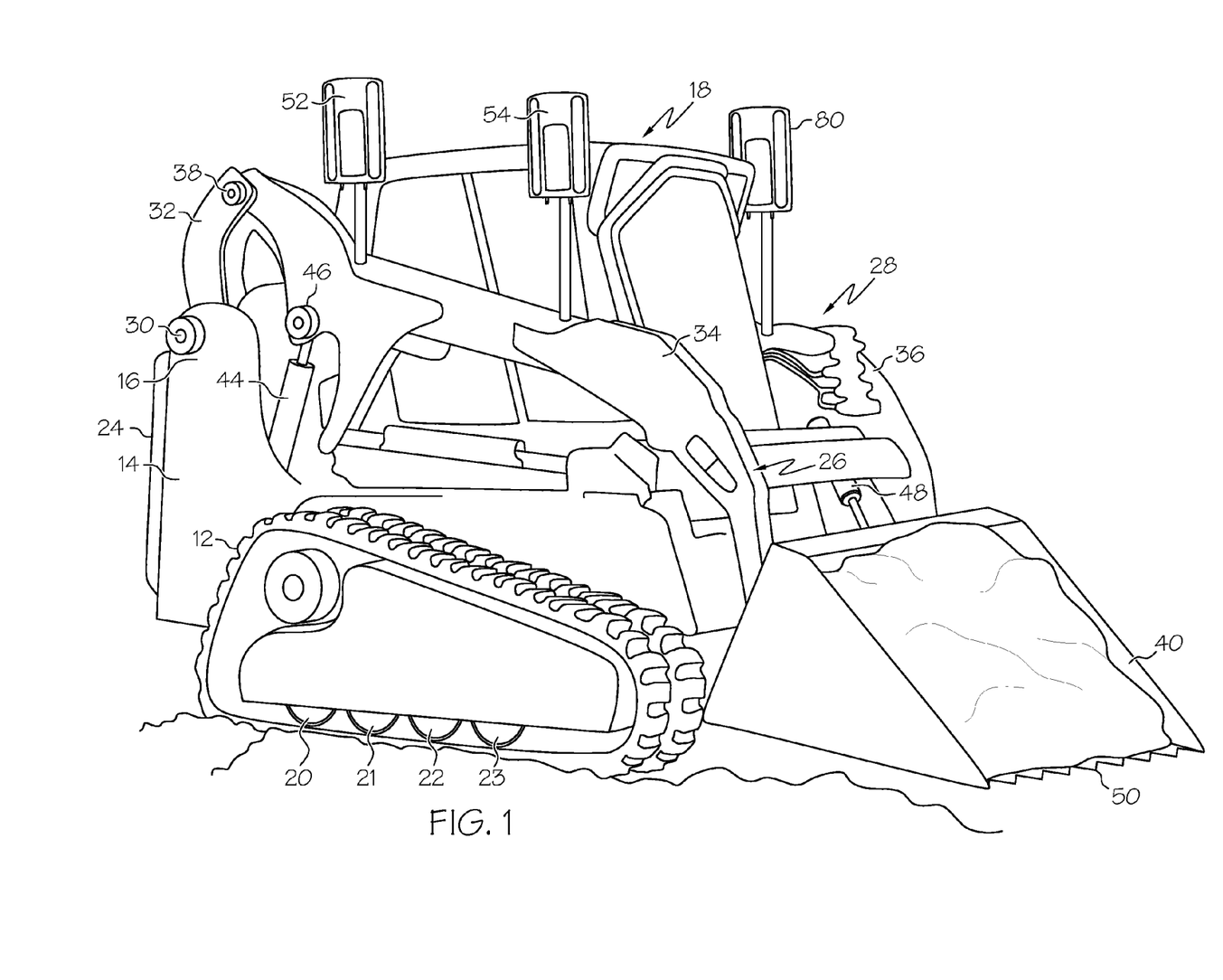
FIG. 1 is a perspective view of a loader, constructed in accordance with the present invention, with the lift arms and implement in a lowered position, and having first and second laser receivers on one lift arm and a third laser receiver on the other lift arm.
Figure 2:
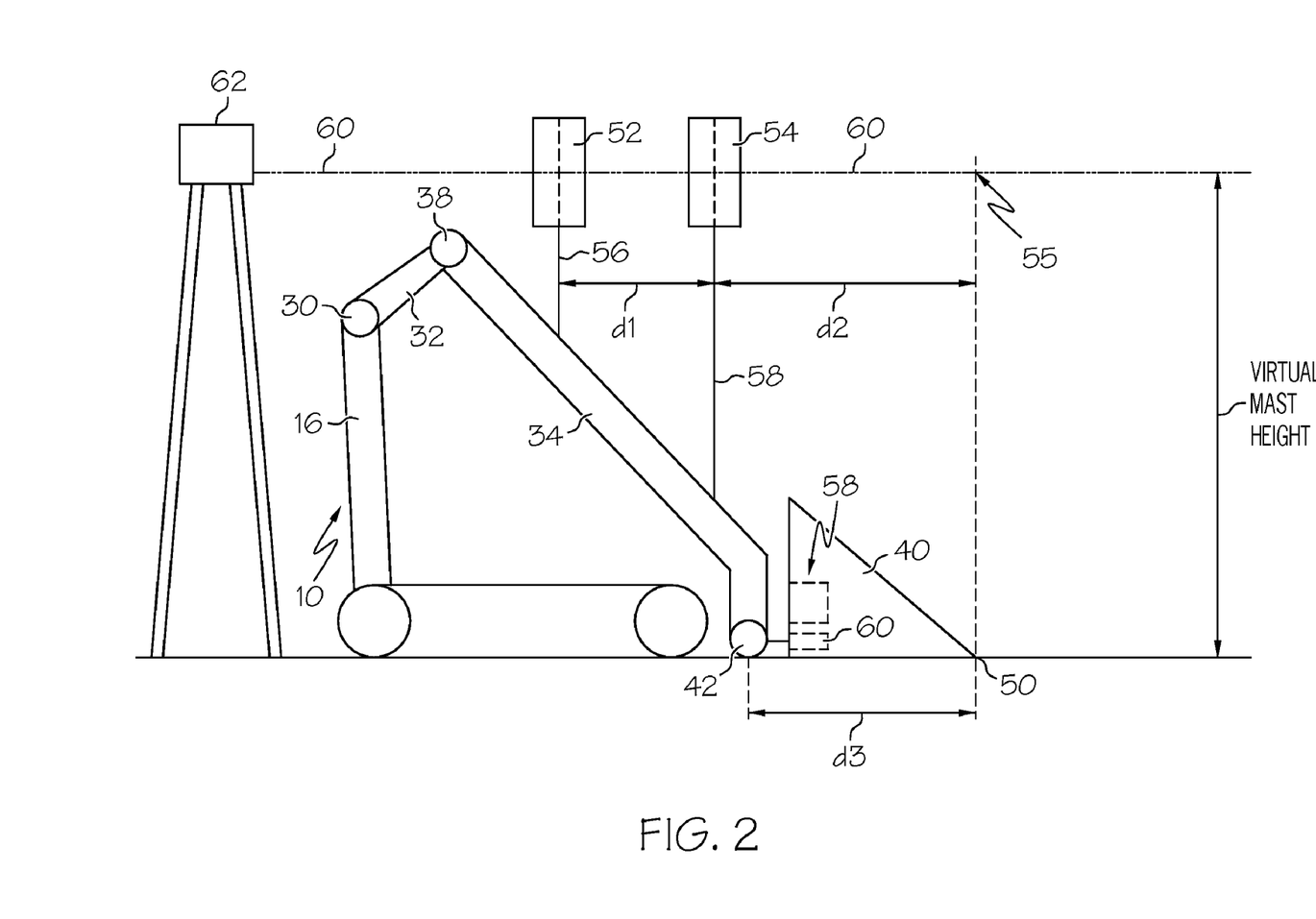
FIG. 2 is a diagrammatic side view of the loader and a laser transmitter, illustrating one approach to determining the elevation of a part of the loader implement.

FIG. 1 and FIG. 2 illustrate a loader 10, more specifically a multi-terrain loader, constructed according to the present invention. It will be appreciated that although the present invention is shown in the drawings as a part of a multi-terrain loader, the invention may also be embodied in a skid steer loader of the type that has a plurality of wheels in place of the pair of endless, driven tracks 12. Additionally, the present invention may be embodied in any loader or similar machine that includes a pair of lift arms and an implement mounted on the lift arms, and in which the elevation of a part of the implement is of concern or of interest.

The loader 10 comprises a body 14 having left and right upright stanchions or tower portions 16, only one of which can be seen in FIG. 1, and an operator's station, generally designated 18. The ground engaging tracks 12 encircle a plurality of driven wheels 20, 21, 22, and 23 that are mounted on, and that support, the body 14. The driven wheels 20-23 and track 12 are part of a loader drive system that also includes an engine (not shown) which is mounted in the body 14, rearward of the operator's station 18 in a rear engine enclosure 24. The loader may be powered and driven by a diesel engine which drives one or more hydraulic pumps. As will be appreciated, such a loader will have various loader components powered or driven by hydraulic motors and cylinders.

The loader 10 further includes right and left interconnected lift arm assemblies 26 and 28 which are pivotally connected with corresponding tower portions 16 and with the body 14 at pivot points 30, only one of which is shown in FIG. 1. The lift arm assemblies 26 and 28 each have a rear link 32, only one of which can be seen in FIG. 1, which is pivotally connected to an associated one of the lift arms 34 and 36 at 38. An implement, which is shown as bucket 40, but which may also be any of a number of different implements, is mounted at the end of the pair of arms 34 and 36 Alternative implements include post hole augers, box blades, dozer blades, asphalt pavers, dual axis tilt buckets, rippers, and diggers.

FIG. 2 illustrates schematically the dimensional relationship of the system components for one approach to determine the elevation of a first part of the implement. The bucket 40 is pivotally connected to the lift arms 34 and 36 for movement about an implement pivot axis point 42 at the forward ends of the arms. Each lift arm 34 and 36 is pivoted relative to the body 12 to lift the bucket 40, or other implement, powered by a lift actuator 44. Actuator 44 is typically a conventional hydraulic cylinder or other linear acting actuator. The lift actuator 44 is connected at one end to the body 14. The lift actuator 44 is connected at its opposite end to the associated lift arm 34 at pivot 46. The bucket 40 may be pivoted relative to the lift arms 34 and 36 by means of one or more tilt actuators 48, which are typically hydraulic or other linear acting actuators, connected between the lift arms 34 and 36, and the bucket 40. The bucket 40 defines a series of digging teeth 50 along its lower front edge.

The present invention provides a system for determining the elevation of a first part of the implement 40. In the arrangement shown in FIG. 2, for example, it is useful to know the elevation of the teeth 50 of bucket 40. To accomplish this according to the present invention, a first elevation sensor, comprising laser receiver 52, is mounted on lift arm 34, and a second elevation sensor, comprising laser receiver 54 is mounted on the lift arm 34, as well. The receivers 52 and 54 are supported by masts 56 and 58, respectively, and respond to a beam of laser light 60 from a laser transmitter 62. The laser receiver 54 is closer to the implement 40 than the laser receiver 52. The laser receivers 52 and 54 are used to determine the elevation of a point in space 55 that is directly above the cutting teeth 50 of the bucket 40. The second elevation sensor 54 is spaced from the first elevation sensor 52 along the arm 34 by a known distance d1, and from the point in space above the teeth 50 by a known distance d2. It will be appreciated that because of the nature of the environment in which the loader 10 operates, placing an actual elevation sensor, such as a laser receiver, on a mast over the cutting teeth 50 is not practical. However, the present invention in effect places a "virtual receiver" on a "virtual mast" directly over the cutting teeth of the bucket. If the height of the virtual mast and the elevation of the virtual receiver point are known, then the elevation of the teeth is also known.

Figure 3:
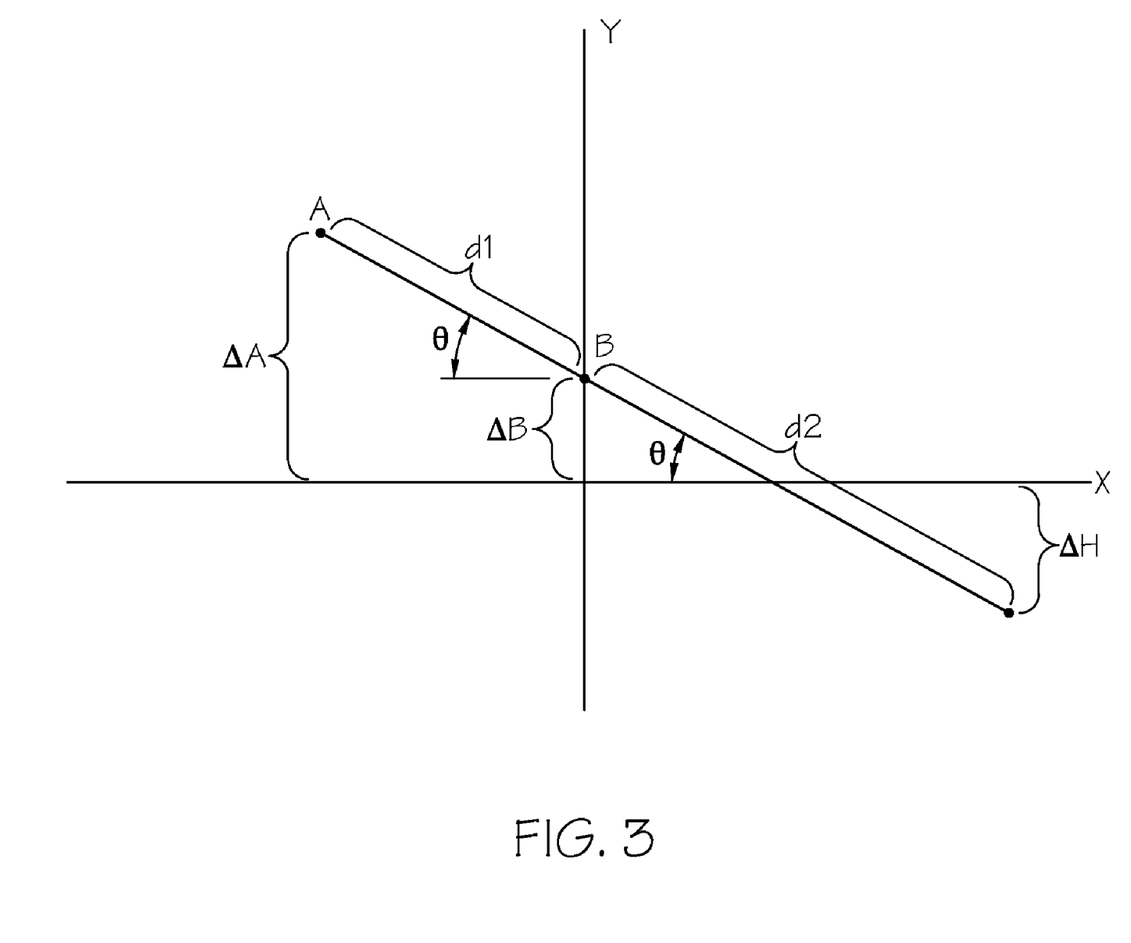
FIG. 3 is a diagram showing relative positions of the laser receivers on one lift arm of the loader.

As shown in FIGS. 2 and 3, the geometry associated with this process is straightforward. Assume that the laser receiver 52 provides an indication that it is ΔA above a nominal "on grade" elevation, that receiver 54, spaced from receiver 52 by a distance d1, provides an indication that it is ΔB above a nominal "on grade" elevation, the assessment of the distance ΔH by which the virtual receiver is below grade is as follows.

The equation of a straight line is Y=MX+C, where M is the slope and C is the Y-axis intercept. In this case, the Y-axis intercept is ΔB and the slope is (ΔB−ΔA)/d1(cos Θ). So the equation of the straight line between A and B is:

$$Y=[(\Delta B-\Delta A)/d1(\cos \Theta)]X+\Delta B$$

The X dimension of the virtual receiver is X=d2(cos Θ). Therefore, $$Y=\Delta H=[(\Delta B-\Delta A)/d1(\cos \Theta)]d2(\cos \Theta)+\Delta B, \text{ which simplifies to}$$

$$\Delta H=[(\Delta B-\Delta A)d2]/d1+\Delta B.$$

Figure 4:
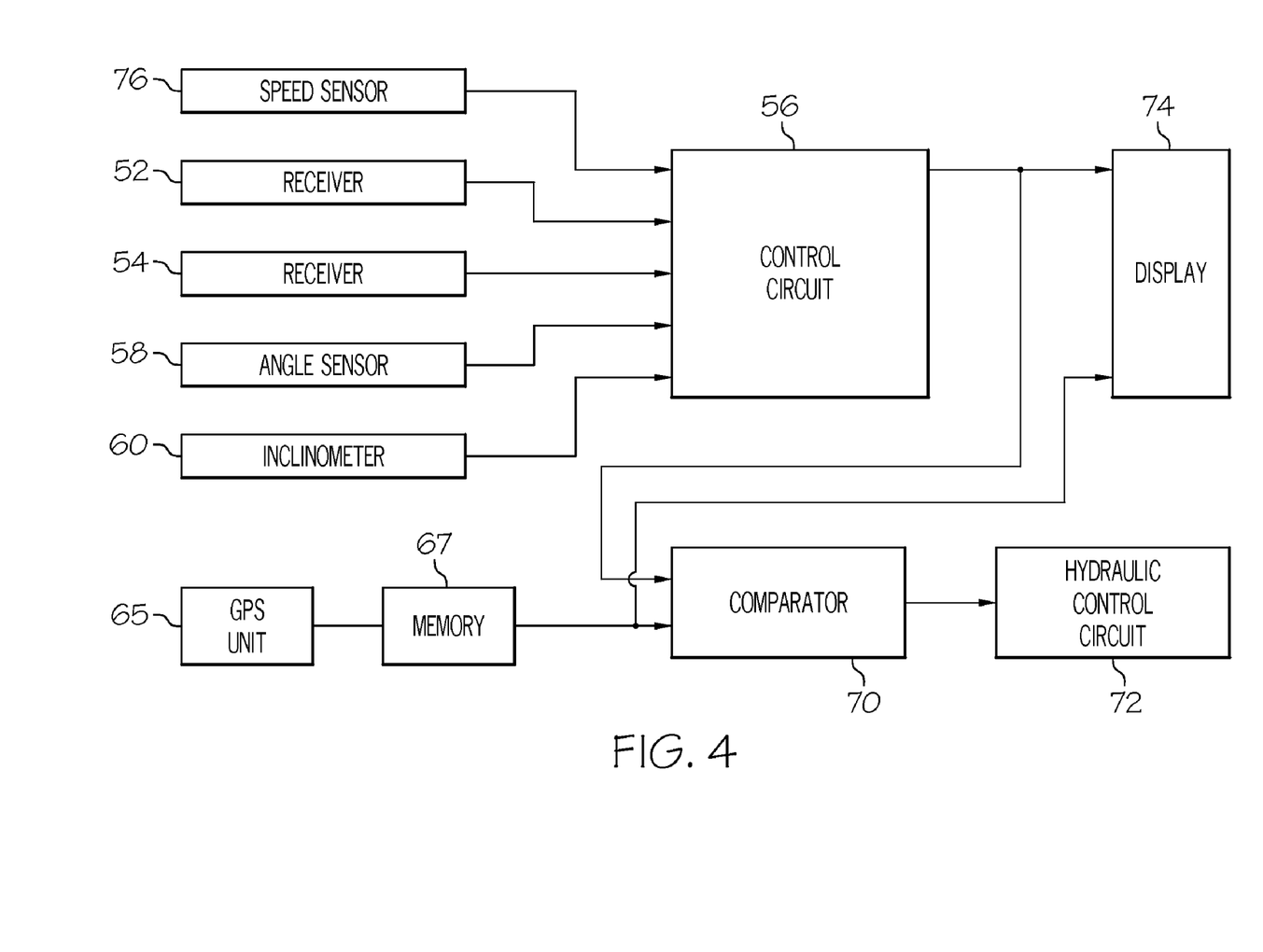
FIG. 4 is a schematic representation of the control system according to the present invention.

The use of the two receivers 52 and 54 to establish an elevation of a point that is not directly beneath either receiver allows the system to determine the elevation of a first part of the implement, namely the teeth, quickly and accurately, without having a sensor on a mast above the implement. This computation assumes that the bucket 40 and the teeth 50, are in a neutral, standard position with respect to the lift arms 34 and 36, such that the virtual mast height is a known constant. If the bucket 40 is tilted so that the teeth 50 are raised or lowered, this assumption will obviously not be accurate. The measured elevation of the teeth 50 can be increased or decreased in dependence upon the pivoting movement of the bucket 40 away from the nominal bucket position in one of several ways. As seen in FIG. 4, the circuit 56, which computes the ΔH from the outputs of the receivers 52 and 54, can also respond to an angle sensor 58 which provides an output that indicates the angular movement of the bucket 40 away from its nominal position. This angle sensor output can then be used to compute trigonometrically the distance by which the teeth of the bucket have been raised or lowered from the nominal position. Alternatively, the control circuit may simply include a look up table which provides the distance by which the teeth of the bucket are raised or lowered from the nominal position for each of a plurality of angular readings. In operation, the angular measurement from the angle sensor 58 may be provided to the control circuit and the stored angle from the look up table which is closest to the measured angle may be used. Alternatively, the circuit may interpolate between the stored angles in the look up table.

In lieu of the angle sensor 58, the system may include a direct measurement arrangement for measuring the extension of the cylinders 48. It will be appreciated that extension and retraction of the cylinders 48 result in lowering and raising the teeth 50 of bucket 40, respectively. It is possible, therefore, to determine the angular position of the position of the bucket 40 with respect to the lift arms 34 and 36, and thus change in the elevation of the teeth 50 from a neutral position, by monitoring the position of the cylinders 48. In this arrangement, the hydraulic cylinders 48 are of the type which incorporate sensors for providing an output related to cylinder piston position. As an example, each piston rod may carry a permanent magnet, with the position of the permanent magnet being determined by a magnetostrictive sensor in the cylinder. Such a cylinder construction is shown in U.S. Pat. No. 7,121,185, issued Oct. 17, 2006, to Alrefai, the relevant portion of which is incorporated by reference. Just as with an angle sensor 58, the outputs of the hydraulic cylinder extension sensors may be used by the control circuit to access a look up table from which the angle of the bucket 40 may be determined.

Another way of adjusting for angular movement of the bucket 40 is to include an inclinometer 60 on the bucket for determining the inclination of the bucket 40. The inclinometer output is compared with the inclination of the arms, with the difference being the relative angular orientation of the bucket with respect to the arms. The angle information can then be used, as with the angle sensor output, above, to determine the amount by which the virtual mast height is to be adjusted. This is accomplished, as described above, either through a trigonometric computation, or by means of a look up table.

Figure 5:
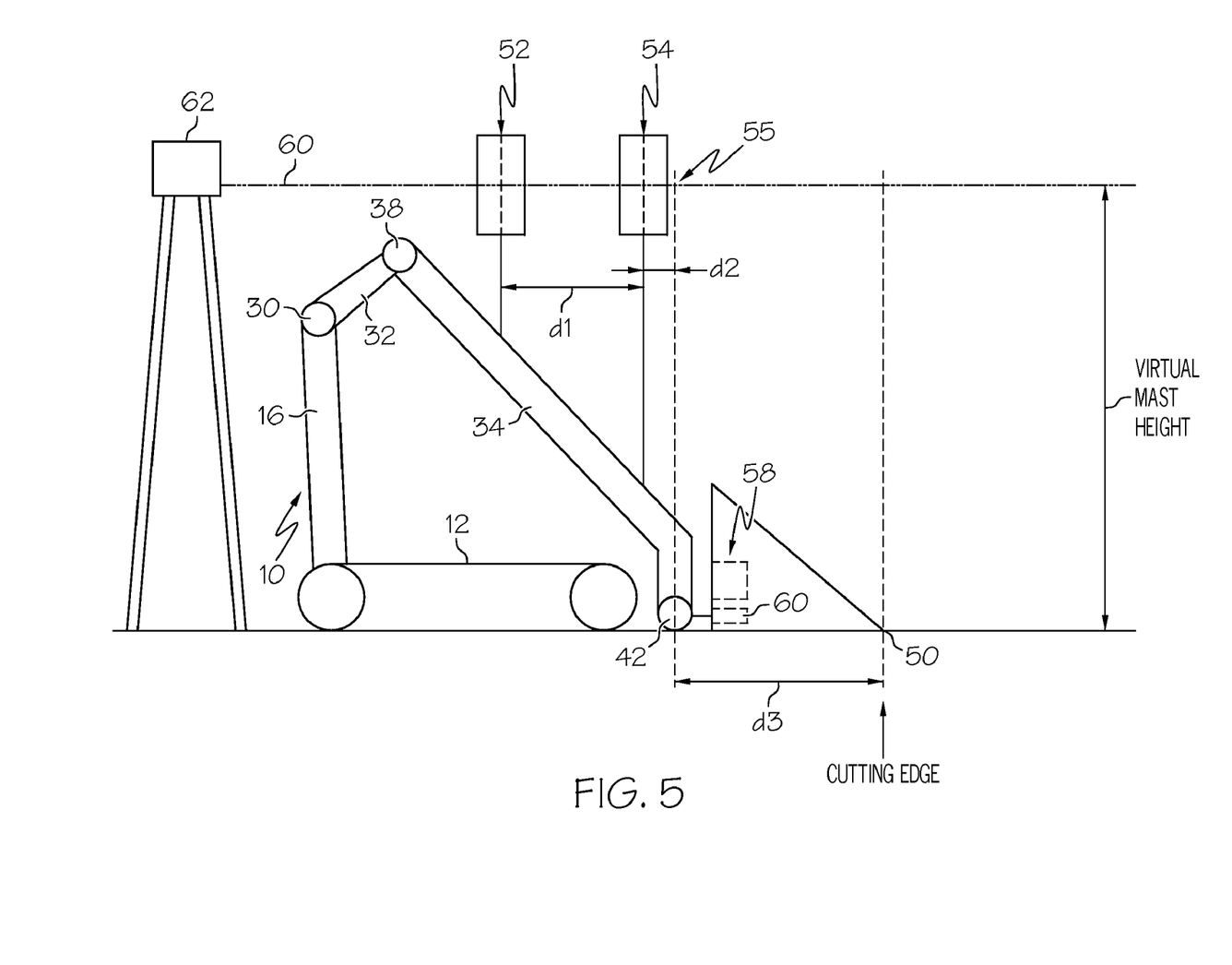
FIG. 5 is a diagrammatic side view of the loader and a laser transmitter, illustrating another approach to determining the elevation of a part of the loader implement.

A variation of the above described computational techniques is illustrated in FIG. 5. In FIG. 5, the virtual receiver point is chosen to be directly above the pivotal connection 42 at the front of the lift arms 34 and 36, where the implement, such as bucket 40, is attached. Note that this produces a somewhat shorter distance d2. The virtual mast height above connection 42 will not change with bucket movement. Once the elevation of the pivotal connection 42 is determined by the control circuit 56 based on the outputs from laser receivers 52 and 54, the elevation of the teeth 50 can be determined, either through a trigonometric calculation, or by using a look up table, based on the output of an angle sensor 58 or an inclinometer 60. It will be appreciated that although both an angle sensor and an inclinometer are illustrated in FIGS. 2 and 5, the typical arrangement would use only one such device to supply information to the control circuit regarding bucket orientation.

FIGS. 2 and 5 depict a laser transmitter 62 projecting a beam of laser light 60 that is rotated in a horizontal reference plane. Each of the receivers 52 and 54 includes a plurality of detectors arranged in a vertical array. The position of the detector or detectors in each array that are illuminated provide an indication of the elevation of the array with respect to the reference plane of light. If desired, however, a transmitter of the type which projects a pair of non-parallel, fan shaped beams that are rotated about a vertical axis can be used. With a transmitter of this type, each of the receivers preferably takes the form of a single detector receiver. With this arrangement, the elevation of the detector is determined by the relative time delay between two successive beam sweeps as compared to the time of rotation for the beams.

In the present invention, the elevation of the first part of the implement is determined by measuring the elevation of a point above the first part. The point is a fixed distance above the first part of the implement and is directly aligned with the first and second elevation sensors. In the arrangement shown in FIG. 2, the first part of the implement is the teeth 50 of the implement. An adjustment is then made to the computed elevation of the teeth based on the angle sensed by angle sensor 58 or the inclination sensed by inclinometer 60. In the arrangement shown in FIG. 5, on the other hand, the first part of the implement is the pivot connection 42 which is pivotally attached to the ends of the lift arms 34 and 36. The elevation of a second part of the implement, namely the teeth 50 of the bucket 40, is then determined based on the output of the angle sensor 58 or the output of the inclinometer 60. In both cases, however, the trigonometric calculation is based on the distance d3, namely the distance from the pivotal connection 42 to the teeth 50 of the bucket.

While aspects of the invention discussed above permit the elevation of an implement on a loader to be controlled with respect to a reference elevation, it is also possible to utilize the system of the present invention for three dimensional contouring of a worksite. To accomplish three dimensional contouring, the system must be capable of measuring the X and Y positions of the machine, so that it can compare the actual elevation of the worksite at a point of interest to a desired elevation. To accomplish this, the system may further include a GPS receiver unit 65, which operates in a conventional manner to provide the X and Y coordinates of the implement. The X and Y coordinates are then supplied to memory 67 in which has been stored a database of the desired elevations of the worksite at points throughout the worksite. The memory 67 provides the desired elevation of the worksite at the point of interest to the comparator 70. Comparator 70 receives the output of control circuit 56, which indicates the measured elevation of the bucket teeth 50, and compares this elevation with desired elevation from memory 67. The difference is then supplied to hydraulic control circuit 72 for controlling operation of the hydraulic valve that controls the supply of hydraulic fluid to hydraulic cylinders 44. The system can therefore automatically control the elevation of the implement, and more particularly, the specific part of the implement as the loader moves about the worksite. It will be appreciated that it may also be desirable for the machine to be operable in a manual mode. For this purpose, the output from memory 67, indicating the desired elevation of the implement, and the output from control circuit 56, indicating the actual elevation of the implement may be supplied to the display 74 in the operator's station 18. The machine operator then manually controls the operation of the machine, knowing the desired elevation of the worksite in the area where the machine is working.

It will be appreciated that the hydraulic controls associated with the system will not respond instantaneously to sensed differences between the desired elevation and the actual elevation of the implement. In fact, it may happen that the system reacts somewhat slowly. In order to provide more time for the system to react, the control circuit 56 may determine the elevation of the first part of the implement by moving the virtual receiver point 55 forward of the first part of the implement. This point may, for example, be moved forward of the first part of the implement by a distance that is directly related to the forward speed of the machine. Toward this end, the control circuit may also be responsive to speed sensor 76.

If desired, the present system may include the ability to determine the lateral tilt of the machine. In front loaders of this type, the lift arms move up and down in unison. Thus, a third beam detector 80 may be mounted on the other of the pair of arms 36 of the machine, spaced from the first and second elevation sensors 52 and 54, for detecting elevation and providing an output to the control circuit, whereby the lateral tilt of the pair of arms 34 and 36 of the machine, and therefore the machine overall, may be determined by the control circuit 56. If desired, the display 74 may provide a lateral tilt display, as well.

As discussed previously, the implement may comprise any of a plurality of attachments as alternatives to the bucket 40 shown in the drawings. If desired, the dimensions of such attachments may be stored by the system, including a dimension comparable to d3, from the pivotal point of attachment of the implement to the arms to a critical part of the implement. The various dimensions may then be used by the control circuit 56 when the implement is changed on the loader. It will be appreciated that this will facilitate changing implements.

Although the presently preferred embodiments of this invention have been described, it will be understood that within the purview of the invention various changes may be made within the scope of the following claims.

The invention claimed is:

1. A system for use with a machine having a pair of arms, said arms having ends which support an implement, said system determining the elevation of a first part of said implement, comprising:
    a first elevation sensor mounted on one of said arms for detecting the elevation of said one of said arms at the point on the arm at which said first elevation sensor is mounted,
    a second elevation sensor mounted on said one of said arms, closer to said implement than said first elevation sensor and spaced from said first elevation sensor and said part of said implement by known distances, said second elevation sensor detecting the elevation of said one of said arms at the point on the arm at which said second elevation sensor is mounted, and
    a control circuit, responsive to said first elevation sensor and said second elevation sensor, for calculating the elevation of said first part of said implement.

2. The system of claim 1 further comprising a laser transmitter for transmitting a reference beam of laser light, and in which said first and second elevation sensors each comprise laser receivers for sensing said reference beam of laser light.

3. The system of claim 2 in which said laser transmitter transmits a beam of laser light that is swept through a reference plane.

4. The system of claim 2 in which said laser transmitter produces a pair of non-parallel, fan shaped beams that are rotated about a vertical axis.

5. The system of claim 1 in which said control circuit determines the elevation of said first part of said implement by determining the elevation of a point above said first part of said implement, said point being a fixed distance above said first part of said implement and aligned with said first and second elevation sensors.

6. The system of claim 1 in which said machine travels across a work site at a forward speed with said implement extending generally forward of said machine in the direction of travel, and in which said control circuit determines the elevation of said first part of said implement by determining the elevation of a point above said first part of said implement, said point being a fixed distance above said first part of said implement and aligned with said first and second elevation sensors, and said point moving forward of said first part of said implement by a distance related to the forward speed of said machine.

7. The system of claim 1 in which said system further includes an inclinometer on said implement, providing an inclinometer output to said control circuit such that said control circuit can determine the elevation of a second part of the implement based on the elevation of said first part of said implement and on the inclination of said implement from said first part of said implement to said second part of said implement.

8. The system of claim 7 in which said implement is attached to the ends of said pair of arms, further comprising a display, responsive to said control circuit, for displaying the elevation of said second part of said implement.

9. The system of claim 1 in which said system further includes an inclinometer on said implement, providing an inclinometer output to said control circuit such that said control circuit can determine the elevation of said first part of said implement, taking into account the inclination of said implement with respect to a nominal implement position.

10. The system of claim 9 in which said implement is attached to the ends of said pair of arms, further comprising a display, responsive to said control circuit, for displaying the elevation of said first part of said implement.

11. The system of claim 1 in which said system further includes an angle sensor providing an angle sensor output to said control circuit indicating the relative angular orientation of said implement with respect to said arms, such that said control circuit can determine the elevation of a second part of the implement based on the elevation of said first part of said implement and on the relative angular orientation of said implement with respect to said arms.

12. The system of claim 11 in which said implement is attached to the ends of said pair of arms, further comprising a display, responsive to said control circuit, for displaying the elevation of said second part of said implement as based on said projected implement elevation.

13. The system of claim 1 in which said system further includes an angle sensor providing an angle sensor output to said control circuit such that said control circuit can determine the elevation of said first part of said implement, taking into account the relative angular orientation of said implement with respect to a nominal angular orientation of said implement.

14. The system of claim 13 in which said implement is attached to the ends of said pair of arms, further comprising a display, responsive to said control circuit, for displaying the elevation of said first part of said implement.

15. The system of claim 1 in further comprising an hydraulic cylinder for pivoting said implement with respect to said arms, said hydraulic cylinder including a sensor which provides an output to said control circuit indicating extension of said cylinder and the amount of pivoting of said implement.

16. The system of claim 1, further comprising a third beam detector, mounted on the other of said pair of arms of said machine and spaced from said first and second elevation sensors, for detecting elevation and providing an output to said control circuit, whereby the lateral tilt of said pair of arms of said machine may be determined by said control circuit.

17. The system of claim 16, further comprising a display, responsive to said control circuit, for displaying the lateral tilt of said pair of arms of said machine.

18. The system of claim 1, in which said implement may comprise any of a plurality of attachments, and in which the dimensions of such attachments are stored in said control circuit to facilitate changing attachments.

19. A system for determining the elevation of a part of an implement, said implement being attached to the ends of a pair of lift arms of a loader machine, comprising:
a laser transmitter providing a reference beam of laser light,
a first beam detector, mounted on one of said pair of lift arms of said loader machine, for detecting said reference beam and providing a first output,
a second beam detector, mounted on said one of said pair of lift arms of said loader machine and spaced along said one of said pair of lift arms from said first beam detector, for detecting said reference beam and providing a second output,
a control circuit, responsive to said first beam detector and to said second beam detector, for determining the elevation of said part of said implement based on said first and second outputs, and providing a projected implement elevation.

20. A system for determining the elevation of a part of an implement, said implement being attached to the ends of a pair of lift arms of a loader machine, according to claim 19, further comprising an inclinometer mounted on said implement and providing an inclinometer output to said control circuit, whereby said control circuit determines the elevation of a second part of the implement based on the computed elevation of the first part of the implement and on the inclination of said implement from said first part to said second part.

21. A system for determining the elevation of a part of an implement, said implement being attached to the ends of a pair of lift arms of a loader machine, according to claim 19, further comprising an angle sensor, mounted on said implement and providing an output to said control circuit indicating a relative angle between said implement and said lift arms, whereby said control circuit determines the elevation of a second part of the implement based on the computed elevation of the first part of the implement and on the relative orientation of said implement with respect to said lift arms.

22. A system for determining the elevation of a part of an implement, said implement being attached to the ends of a pair of lift arms of a loader machine, according to claim 19, further comprising an inclinometer mounted on said implement and providing an inclinometer output to said control circuit such that said control circuit can determine the elevation of said first part of said implement, taking into account the inclination of said implement with respect to a nominal implement position.

23. A system for determining the elevation of a part of an implement, said implement being attached to the ends of a pair of lift arms of a loader machine, according to claim 19, further comprising an angle sensor providing an output to said control circuit indicating a relative angle between said implement and said lift arms, such that said control circuit can determine the elevation of said first part of said implement, taking into account the relative angular orientation of said implement with respect to a nominal angular orientation of said implement.

24. A system for determining the elevation of a part of an implement, said implement being attached to the ends of a pair of lift arms of a loader machine, according to claim 19, further comprising a display, responsive to said control circuit, for displaying the elevation of said part of said implement as based on said projected implement elevation.

25. A system for determining the elevation of a part of an implement, said implement being attached to the ends of a pair of lift arms of a loader machine, according to claim 19, further comprising a third beam detector, mounted on the other of said pair of lift arms of said loader machine and spaced from said first and second beam detectors, for detecting said reference beam and providing a third output to said control circuit, whereby the lateral tilt of said loader machine may be determined by said control circuit.

26. A system for determining the elevation of a part of an implement, said implement being attached to the ends of a pair of lift arms of a loader machine, according to claim 25, further comprising a display, responsive to said control circuit, for displaying the elevation of said part of said implement as based on said projected implement elevation, and the lateral tilt of said loader machine.

27. A system for determining the elevation of a part of an implement, said implement being attached to the ends of a pair of lift arms of a loader machine, according to claim 19, in which said implement may comprise any of a plurality of attachments, and in which the dimensions of such attachments are stored in said control circuit to facilitate changing attachments.

28. A system for determining the elevation of a part of an implement, said implement being attached to the ends of a pair of lift arms of a loader machine, according to claim 19, further comprising a vehicle speed sensor for determining the forward speed of said loader machine and providing an indication of such speed to said control circuit, whereby said circuit projects the elevation of said implement further forward in response to increases in speed of said loader machine.

29. A system for determining the elevation of a part of an implement, said implement being attached to the ends of a pair of lift arms of a loader machine, according to claim 19, further comprising a hydraulic cylinder for pivoting said implement with respect to said arms, said hydraulic cylinder including a sensor which provides an output to said control circuit indicating extension of said cylinder and the amount of pivoting of said implement.

* * * * *